(12) United States Patent
Kailey et al.

(10) Patent No.: US 11,630,624 B1
(45) Date of Patent: Apr. 18, 2023

(54) CONCURRENT EVENT DETECTION FOR DISTRIBUTED RASTERIZATION PROCESSING IN A PRINTING ENVIRONMENT

(71) Applicants: Walter F. Kailey, Frederick, CO (US); Patrick Curran, Boulder, CO (US)

(72) Inventors: Walter F. Kailey, Frederick, CO (US); Patrick Curran, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/693,681

(22) Filed: Mar. 14, 2022

(51) Int. Cl.
G06F 3/12 (2006.01)

(52) U.S. Cl.
CPC .......... G06F 3/1273 (2013.01); G06F 3/1203 (2013.01); G06F 3/124 (2013.01); G06F 3/126 (2013.01); G06F 3/1211 (2013.01); G06F 3/1279 (2013.01)

(58) Field of Classification Search
None
See application file for complete search history.

(56) References Cited

U.S. PATENT DOCUMENTS

| | | | | |
|---|---|---|---|---|
| 6,483,524 B1 * | 11/2002 | Petchenkine | ............. | G06F 8/34 715/835 |
| 8,015,564 B1 * | 9/2011 | Beyer | ..................... | G06F 9/505 718/103 |
| 8,112,425 B2 | 2/2012 | Baum et al. | | |
| 10,459,933 B2 | 10/2019 | Alpers et al. | | |
| 11,157,882 B1 | 10/2021 | Liu et al. | | |
| 2018/0101466 A1 * | 4/2018 | O'Dowd | ............. | G06F 11/3664 |
| 2019/0034130 A1 * | 1/2019 | Tajima | ................. | G06F 3/1259 |
| 2021/0103575 A1 | 4/2021 | Baum et al. | | |
| 2021/0297355 A1 | 9/2021 | Bartholomew et al. | | |
| 2021/0334188 A1 | 10/2021 | Xia | | |
| 2021/0382751 A1 * | 12/2021 | Kitawaki | ............. | G06F 9/5038 |

FOREIGN PATENT DOCUMENTS

| | | |
|---|---|---|
| CN | 113010158 A | 6/2021 |
| EP | 3866394 A1 | 8/2021 |
| WO | 2021224713 A1 | 11/2021 |

OTHER PUBLICATIONS

Gholamian et al; A Comprehensive Survey of Logging in Software; Oct. 24, 2021.
Schipper et al; Tracing Back Log Data to its Log Statement; Ieee/ACM 16th International Conference on Mining software Repositories 2019.

* cited by examiner

*Primary Examiner* — John R Wallace
(74) *Attorney, Agent, or Firm* — Duft & Bornsen, PC

(57) ABSTRACT

Systems and methods are provided for event detection. One embodiment includes an interface that acquires logs, and a controller that is able to identify events recited in the logs, to include the events within a list sorted based on at least one of start times or end times indicated by the timing data, and to determine a longest duration of the events. The controller receives a requested time, calculates a prior time separated by the longest duration from the requested time, and processes the list by: identifying a first index of the list for a first event in time having a start time on or after the prior time, and identifying a last index of the list for a last event in time having a start time on or before the requested time. The controller generates a set of events bounded by the first index and the last index.

20 Claims, 11 Drawing Sheets

FIG. 7
EVENT LIST

| INDEX | START TIME | END TIME | DURATION | SHEETSIDE | NODE | POH | EVENT TYPE | EVENT NAME |
|---|---|---|---|---|---|---|---|---|
| 0 | 150ms | 291ms | 161ms | 16 | HEAD | N/A | PREPROCESSING | IMPOSITION |
| 1 | 179ms | 760ms | 581ms | 2 | END 1 | 1-A | RASTERIZATION | HALFTONE |
| 2 | 251ms | 520ms | 269ms | 1 | END 12 | 12-C | RASTERIZATION | POST PROCESS |
| 3 | 265ms | 1321ms | 1056ms | 7 | END 15 | 15-F | RASTERIZATION | RASTERIZE |

FIG. 8
DICTIONARY

| KEY | INDICES |
|---|---|
| 150ms | [0] |
| 175ms | [1] |
| 250ms | [2], [3] |

CONCURRENT EVENT DETECTION FOR DISTRIBUTED RASTERIZATION PROCESSING IN A PRINTING ENVIRONMENT

TECHNICAL FIELD

The following disclosure relates to the field of printing, and in particular, to rasterization of print jobs for production printers.

BACKGROUND

Entities with substantial printing demands typically use a production printer. A production printer is a high-speed printer used for volume printing, such as a continuous-forms printer that prints on a web of print media stored on a large roll. A production printer typically includes a localized print controller that manages the overall operation of the printer, and a marking engine (sometimes referred to as an "imaging engine" or a "print engine"). The marking engine includes one or more arrays of printheads.

Upon receiving rasterized print data (e.g., bitmaps representing each page) for a print job, the marking engine operates individual printheads to mark the web based on the rasterized print data. Thus, the printer marks physical pages based on the digital information of the print job.

Because many production printers are physically capable of printing hundreds of pages per minute, and because high volume storage of rasterized pages would be extremely expensive, it is often desirable to rasterize incoming print data in real time at the speed of the printer. However, the process of rasterization is notably processing-intensive. Thus, a production printer may be supported by a computing system that engages in massively parallel processing to ensure that rasterization keeps up with physical printing speed. The computing system rasterizes and delivers sheet-side images for printing in a just-in-time manner for the production printer as printing continues.

It is not uncommon for computing systems to encounter issues which cause them to fail to deliver rasterized print data to a production printer at the rate of operation of the production printer. In such instances, the production printer encounters a "backhitch," wherein printing halts and it may be necessary to reposition/rewind the web of print media that is being marked. This results in downtime during which the production printer is not marking pages, which is undesirable.

Thus, those who operate production printers and associated computing environments continue to seek out new techniques and systems for reducing the prevalence of backhitches.

SUMMARY

Embodiments described herein provide for analysis of events/traces found within log files generated by nodes of a distributed computing system for rasterizing a print job, in order to detect events that were occurring at the same time at each of those nodes. These analysis techniques index the events in a format that enables rapid detection of concurrent events for any requested time. In this manner, an operator of a print shop may select multiple times for review, and rapidly receive input describing concurrent events at each of those times. In further embodiments, the concurrent events are graphically depicted in order to illustrate which nodes of the computing system encountered each of the events.

One embodiment is an event detection system that includes an interface and a controller. The interface is able to acquire logs for each of multiple nodes of a distributed computing system that rasterizes print data for a print job, each log reciting events encountered by at least one of the nodes during rasterization of print data for the print job, and further reciting timing data pertaining to the events. The controller is able to identify the events recited in the logs, to include the events within a list sorted based on at least one of start times or end times indicated by the timing data, and to determine a longest duration of the events. The controller is also able to receive a request to identify events occurring at a requested time, to calculate a prior time separated by the longest duration from the requested time, and to process the list by: identifying a first index of the list for a first event in time having a start time on or after the prior time, and identifying a last index of the list for a last event in time having a start time on or before the requested time. The controller generates a set of events from the list, bounded by the first index and the last index of the list.

A further embodiment is a non-transitory computer readable medium embodying programmed instructions which, when executed by a processor, perform the steps of acquiring logs for each of multiple nodes of a distributed computing system that rasterizes print data for a print job, each log reciting events encountered by at least one of the nodes during rasterization of print data for the print job, and further reciting timing data pertaining to the events. The steps also include identifying the events recited in the log, including the events within a list sorted based on at least one of start times or end times indicated by the timing data, determining a longest duration of the events, receiving a request to identify events occurring at a requested time, and calculating a prior time separated by the longest duration from the requested time. Still further, the steps include processing the list by: identifying a first index of the list for a first event in time having a start time on or after the prior time, and identifying a last index of the list for a last event in time having a start time on or before the requested time. The steps also include generating a set of events from the list, bounded by the first index and the last index of the list.

A further embodiment is a method that includes the steps of acquiring logs for each of multiple nodes of a distributed computing system that rasterizes print data for a print job, each log reciting events encountered by at least one of the nodes during rasterization of print data for the print job, and further reciting timing data pertaining to the events. The steps also include identifying the events recited in the log, including the events within a list sorted based on at least one of start times or end times indicated by the timing data, determining a longest duration of the events, receiving a request to identify events occurring at a requested time, and calculating a prior time separated by the longest duration from the requested time. Still further, the steps include processing the list by: identifying a first index of the list for a first event in time having a start time on or after the prior time, and identifying a last index of the list for a last event in time having a start time on or before the requested time. The steps also include generating a set of events from the list, bounded by the first index and the last index of the list.

Other illustrative embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

FIG. 7 is a list of events in an illustrative embodiment.

FIG. 8 is a dictionary for tracking events in an illustrative embodiment.

DETAILED DESCRIPTION

The figures and the following description illustrate specific illustrative embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
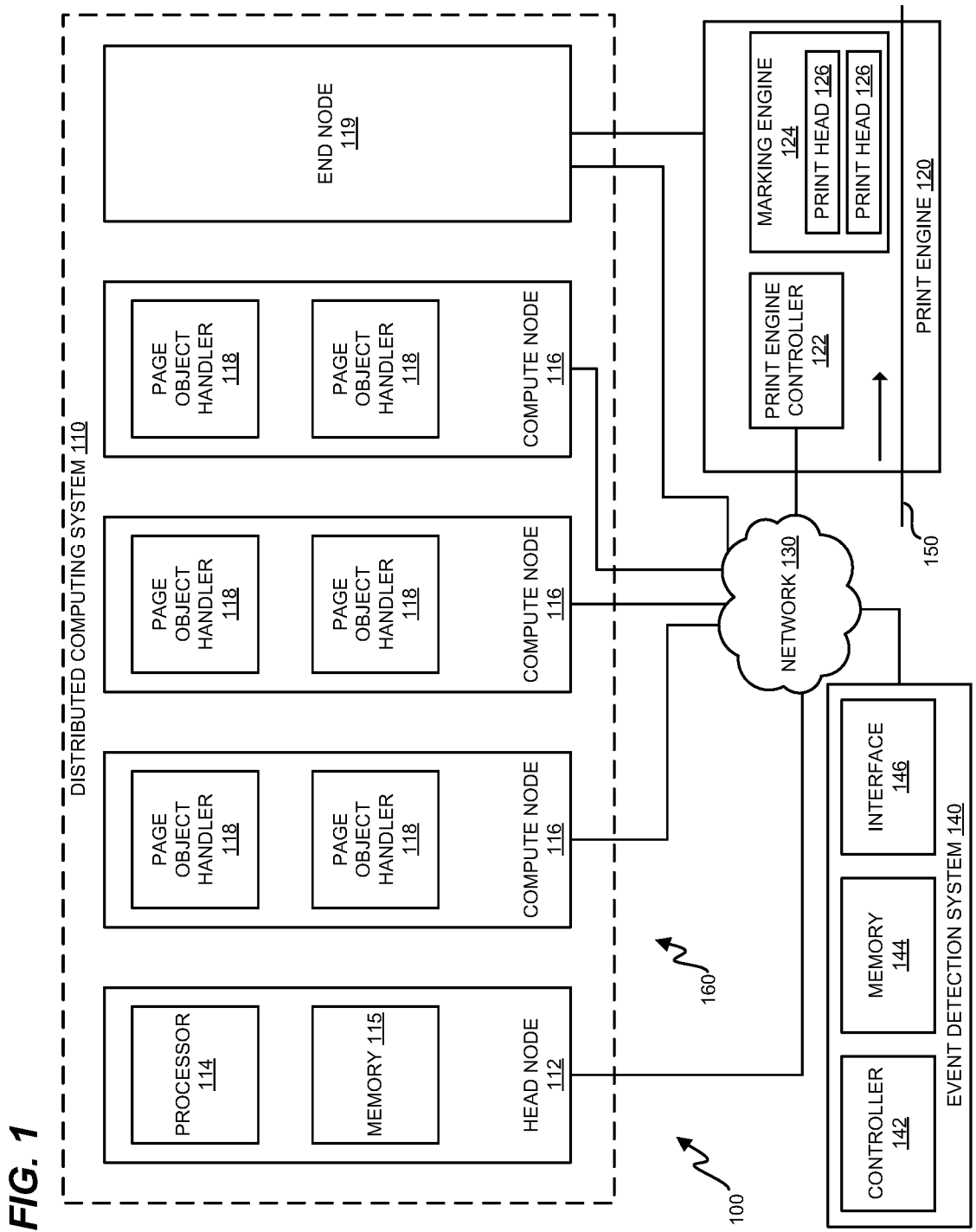
FIG. 1 is a block diagram of a print processing system in an illustrative embodiment.

FIG. 1 is a block diagram of a print processing system 100 in an illustrative embodiment. Print processing system 100 comprises any system, device, or component operable to perform parallel processing in order to rasterize print data for a print job. Print data may comprise Page Description Language (PDL) print data, such as Portable Document Format (PDF) data. Print processing system 100 has been enhanced with an event detection system 140, which is capable of processing logs from each of multiple nodes of the print processing system 100, in order to determine events that occurred concurrently during parallel processing of a print job.

In this embodiment, print processing system 100 includes a distributed computing system 110, which performs rasterization of print data for a print job. Each of the components of distributed computing system 110 may comprise a combination of hardware processors, memories, and/or interfaces of a production printer. Sheetside images generated by distributed computing system 110 are provided to print engine 120 for printing. In this embodiment, distributed computing system 110 includes a head node 112, comprising a processor 114 and memory 115, as well as multiple compute nodes 116 and one or more end nodes 119. Each head node 112, compute node 116, and end node 119 of the distributed computing system 110 may comprise an independent, physically distinct computing system (i.e., a "hardware node"), such as an independent computer housed in a tower or slot. Furthermore, compute node 116 implements one or more Page Object Handlers (POHs) 118. Each POH 118 may be implemented by a separate processor or set of processors of a compute node 116. Communications between head node 112, compute nodes 116 and end nodes 119 may be performed via a network 130 that is private and internal, or conceivably, even the Internet. The various components of the distributed computing system 110 may together implement, or be referred to as, a Digital Front End (DFE).

Processor 114 of the head node 112 may perform initial processing of print data for a print job, and/or impositioning. During impositioning, print data is arranged into sheetsides stored in memory. The sheetsides of print data are sent by processor 114 to various ones of the POHs 118 of the compute nodes 116 for rasterization, based on the current processing loads of the POHs 118.

Each POH 118 engages in rasterization processing of a sheetside of print data in order to generate a sheetside image (e.g., a bitmap). In some embodiments a POH 118 may perform further processing such as bitmap scaling, half-toning, post processing (e.g., the application of special marks onto the page), etc. However, in many embodiments these post-rasterization processes are performed by an end node 119. Thus, a POH 118 may additionally transmit sheetside images to an end node 119. The end node 119 may perform halftoning, the addition of special marks, and other post-processing before transmitting the series of sheet sides in pre-determined order to one or more print engine controllers 122 for printing via printheads 126 of a marking engine 124, in a just-in-time manner. In this manner, an end node 119 may control a print engine 120 based on input from a variety of POHs 118 as a web 150 of print media proceeds through the print engine 120.

An end node 119 of the distributed computing system 110 may handle rasterized data by performing half-toning and/or post-processing on bitmaps from the compute nodes 116, and then export processed bitmaps to print engine 120 for printing. Depending on embodiment, there may be one or more (e.g., two) end nodes 119 per print engine 120, and one or more (e.g., two) print engines 120 at production printer 160. In this embodiment, the end node 119 communicates with the print engine 120 via a dedicated communications link that is capable of handling a notable amount of data throughput. In this embodiment, the combination of print engine 120 and distributed computing system 110 comprises a production printer 160.

As each of the components of the print processing system 100 performs processing, it may independently store a log indicating processing events that have occurred. These processing events may occur on a millisecond scale, or even faster.

In some embodiments, the event log may be exported to a performance profiling system that includes event detection system 140 on the network 130, or it may be retained in local memory and/or local mass memory storage for later export to the performance profiling system including the event detection system 140, or both.

In many circumstances, it may be beneficial to review the logs of the print processing system 100. This may be done retrospectively or incrementally as log entries are being added, or first the former and then the latter may be performed. For example, it is not unheard of for a distributed computing system 110 to encounter delays that prevent it from providing a sheetside image needed by print engine 120 in a timely manner. In such an instance, print engine 120 may halt printing in what is known as a backhitch. This results in printing delays as web 150 is adjusted before printing resumes. Reviewing logs of the distributed computing system 110 enables the causes of such delays to be determined. The occurrence of similar delays in the future can then be prevented after the causes of the delays are understood.

Although the analysis of event logs is highly desirable, event logs occupy substantial space in memory, especially when aggregated across the entirety of the distributed computing system 110. Thus, the act of identifying and inspecting events across all event logs remains highly processing intensive. This results in processing difficulties when an operator wishes to identify events happening at multiple points in time in a live, interactive manner.

To address this concern, print processing system 100 has been enhanced with an event detection system 140 that is capable of receiving input selecting a requested time, and rapidly (e.g., in real-time) presenting information describing concurrent events within distributed computing system 110 at the requested time.

In this embodiment, event detection system 140 includes controller 142, memory 144, and interface 146. Interface 146 acquires logs from the distributed computing system 110, on an ongoing basis, on a periodic basis, or in response to certain events. Memory 144 stores the logs for processing, as well as event lists and/or dictionaries based on the event logs. Controller 142 processes the logs to generate the event lists and/or dictionaries stored in memory 144. Controller 142 may be implemented as custom circuitry, as a hardware processor executing programmed instructions, etc. Interface 146 may comprise an Ethernet or other network interface, and memory 144 may comprise Random Access Memory (RAM) or long-term storage as desired.

The particular arrangement, number, and configuration of components described herein is illustrative and non-limiting. Illustrative details of the operation of event detection system 140 will be discussed with regard to FIG. 2. Assume, for this embodiment, that distributed processing system 110 has been actively processing print data for a print job, but a processing error has resulted in a backhitch at print engine 120. A print shop operator makes a request to inspect the events that occurred in the distributed computing system 110 at a time prior to the backhitch, and this results in the head node 112, the compute nodes 116, and/or the end node 119 of the distributed computing system 110 transmitting logs to event detection system 140 for analysis.

Figure 2:
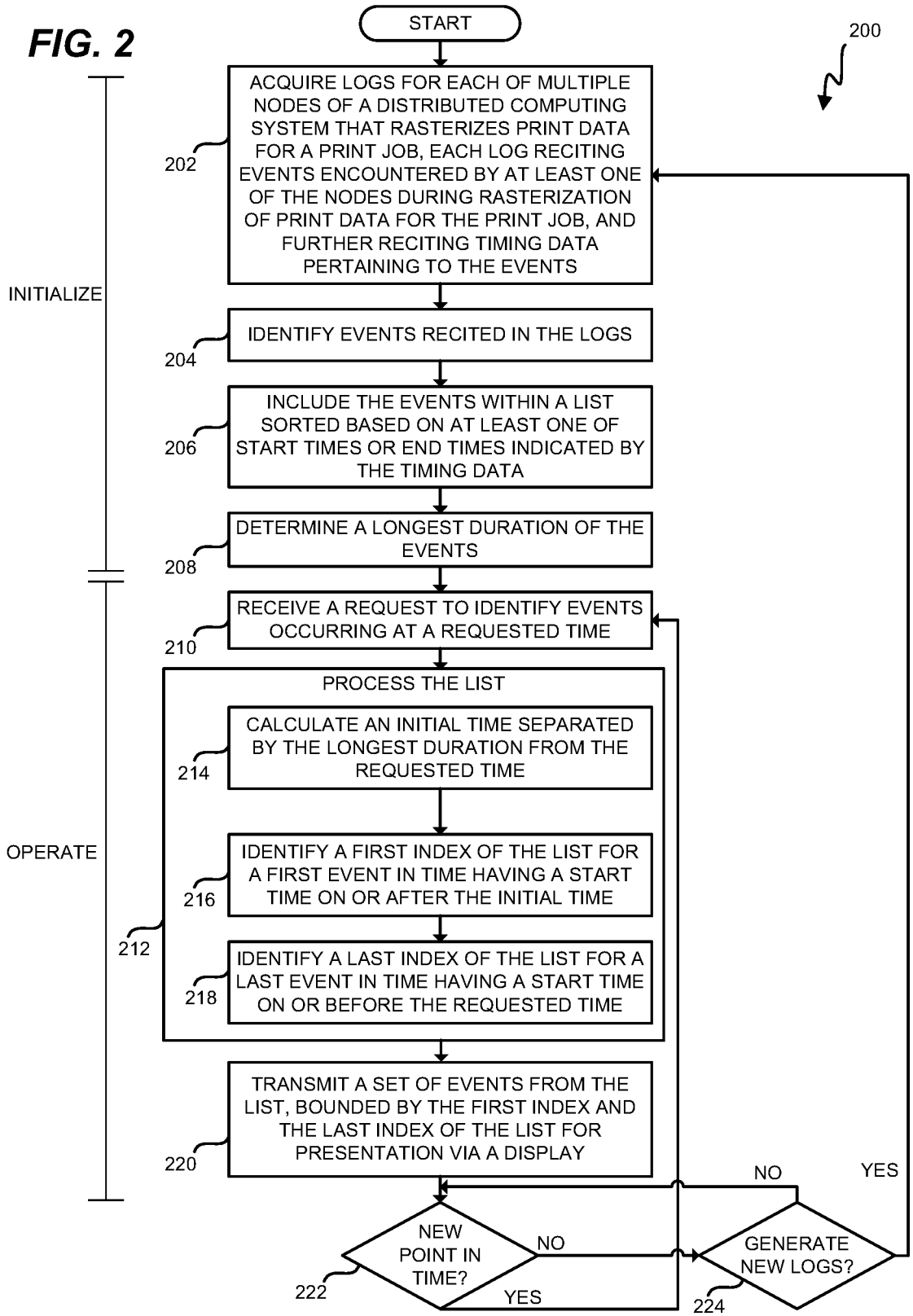
FIG. 2 is a flowchart illustrating a method for detecting concurrent events for a print processing system in an illustrative embodiment.

FIG. 2 is a flowchart illustrating a method 200 for detecting concurrent events for a print processing system 100 in an illustrative embodiment. The steps of method 200 are described with reference to event detection system 140 of FIG. 1, but those skilled in the art will appreciate that method 200 may be performed in other systems. The steps of the flowcharts described herein are not all inclusive and may include other steps not shown. The steps described herein may also be performed in an alternative order.

Steps 202-208 may be considered an "initialization phase," wherein controller 142 prepares a list of events that is rapidly traversable in response to requests. When initialization is completed, the controller 142 is capable of rapidly reporting concurrent events for any of a variety of points in time requested by a user.

In step 202, interface 146 acquires logs for each of multiple nodes (e.g., head node 112, compute nodes 116, end nodes 119, print engines 120) of a distributed computing system 110 that rasterizes print data for a print job. Each log recites events encountered by at least one of the nodes during rasterization of print data for the print job, and further recites timing data pertaining to the events. As used herein, an event comprises an action or circumstance encountered by a processor, POH 118, or node (e.g., as reported by a trace). That is, events refer to processing operations, and specifically to processing operations related to handling print data for a print job. Events may be referred to in a log by a category or type, and may be accompanied by additional event data specific to the recited event. Timing data may indicate, for each event, a start time, end time, and/or duration of the event.

Logs may be provided in a variety of formats, such as customized messages, Comma Separated Value (CSV) files, text files, etc. Logs may be provided automatically by the nodes, or may instead be actively acquired via requests sent by interface 146, depending upon embodiment. In one embodiment, the nodes provide event data to a centralized log, or location in memory 144 for a set of logs.

In step 204, controller 142 identifies events recited in the logs. Identifying the events may comprise determining, for each event, a category or type, additional event data, start time, end time, and/or duration. Controller 142 may perform these operations by analyzing each log until a complete set of events, for all nodes, has been constructed for a desired time period (e.g., the time period during which a specific print job was being processed, the past hour, the past day, etc.). In some embodiments, controller 142 may continue to receive trace data over network 130, extract event data from new traces received, and update the event data with information about the newly extracted events, while other processing threads in the controller 142 are processing user requests to display information about the events.

In step 206, controller 142 includes the events within a list sorted based on at least one of start times or end times indicated by the timing data. This may comprise calculating or recording any suitable combination of start time, end time, and/or duration for each of the events in the logs. In many embodiments, this comprises at least recording one of a start time or end time for each event.

Controller 142 may also combine the time and/or duration with a category/type for an event and additional event data. The resulting combination may then be stored in the list as a tuple. The list may then be stored in memory 144 in any format desired. In many embodiments, controller 142 ensures that even if event logs are received in a variety of formats, event information is condensed into a uniform format across the entire list.

In a further embodiment, controller 142 may generate multiple lists, each list having events occupying different ranges of durations. This enhances the speed of processing for steps 214-220 recited blow. In such an embodiment, the controller 142 extracts events having a duration greater than a predefined threshold from the list, and then may place the extracted events into a second list for the controller to independently process in response to requests. The predefined threshold may comprise a number of standard deviations from a mean duration of the events, a specific time period (e.g., ten seconds, five seconds), etc.

In step 208, controller 142 determines a longest duration of the events on the list. The longest duration may be determined by directly comparing duration information in the list. If there is no duration information in the list, then controller 142 may calculate duration based on a combination of start time and end time for each event. In embodiments where controller 142 implements multiple lists, controller 142 may calculate longest durations for each of the lists individually.

With step 208 having been completed, the events are stored in a suitable format for rapid processing in response to requests. Thus, processing continues to steps 210-220, which constitute an operating phase (e.g., a processing phase). During this phase, controller 142 is capable of responding, in real-time (e.g., in less than one second) to requests to report all events happening concurrently at a requested time.

In some embodiments, new traces may be received by the controller 142 over the network 130 while controller 142 is responding in real time to requests to report all events happening concurrently at a requested time. In such embodiments, events of any known type may be extracted from the newly received traces, and the event data for the newly received event's type is updated by a separate processing thread in background, so that subsequent requests will consider data pertaining to the newly added event, as well as all the previous events. For example, the newly detected event may be reduced to a tuple of event data and inserted into the list of such tuples for its event type at the proper place. Also, the maximum duration for the event type of the newly detected event may be updated, if the new event has longer duration than any previously known event of that type; and the index map for the type of the newly detected event may be updated to include the newly detected event.

In step 210, interface 146 receives a request to identify events occurring at a requested time. The request may be received, for example, from a network-coupled computing device operated by a user (e.g., a print shop operator). The request itself indicates a specific requested time that a print shop operator wishes to identify events for. This time may be reported, for example, down to the second or millisecond. In one embodiment, the request comprises a request generated by a browser, such as a Hypertext Transfer Protocol Secure (HTTPS) POST or GET command.

In step 212, controller 142 initiates processing of the list, which includes steps 214, 216, and 218. During these steps, controller 142 identifies a range of events from a prior time to the requested time indicated in the request.

In step 214, controller 142 calculates a prior time separated by the longest duration from the requested time. This may be performed, for example, by subtracting the longest duration from the requested time. That is, for each list, controller 142 subtracts a corresponding duration from the requested time to determine a prior time. This prior time represents the earliest point in time that an event stored on the list, and occurring at the requested time, could have started. In further embodiments, such as those involving a search along a list that is reversed in time, or a search that traverses a list backwards, the "prior time" may actually represent a "subsequent time" in the future, and may be calculated by adding the longest duration to the requested time.

In step 216, controller 142 identifies a first index of the list for a first event in time having a start time on or after the prior time. That is, the first event starts chronologically before other events having start times close to the prior time. In one embodiment, identifying the first index may comprise traversing the list until an event is detected having a start time on or after the prior time. Because the list is sorted by start time or end time, the first index represents a first boundary of a group of events within the list that began between the prior time and the requested time. In some embodiments discussed with regard to FIGS. 4-7 below, dictionaries are utilized to further enhance the speed of this process.

In step 218, controller 142 identifies a last index of the list for a last event in time having a start time on or before the requested time. Identifying the last index may comprise traversing the list until a last event is detected having a start time on or before the requested time. Again, because the list is sorted by start time or end time, the last index represents a second boundary of a group of events within the list that began between the prior time and the requested time. In a similar manner to step 218 above, in some embodiments, dictionaries are utilized to further enhance the speed of this process.

In a further embodiment, the controller 142 filters out (i.e., removes from consideration) all events from the list having end times before the requested time. These events, having ended before the requested time, were not occurring at the requested time. In some embodiments, the controller 142 identifies a type of each event, and filters out events from the list based on type. For example, certain types of printer status events (e.g., "print engine on") may be intentionally ignored or discarded, to ensure that only events related to rasterization are considered.

In step 220, controller 142 operates interface 146 to generate a set of events from the list, bounded by the first index and the last index of the list. This set of events comprises all events that were occurring during the requested time (e.g., the combination of events found from each list). The set of events may further be transmitted for presentation at a display or for storage in memory. Because the initialization process of steps 202-208 has generated and arranged the list in a manner that facilitates easy traversal by start time or end time, the processing of requests for various points in time utilizes much less in the way of processing resources. This enables controller 142 to rapidly repeat steps 210-220, and/or even perform those steps in parallel while newly received traces are processed and new events extracted and pre-processed in background.

In one embodiment, for each requested time, controller 142 performs steps 210-220 for additional points in time within a window surrounding the requested time. For example, controller 142 may repeat steps 210-220 for every hundred milliseconds in time, within a range of two seconds before and after the requested time. Controller 142 then reports the sets of events sequentially in time. These sets of events may then be used for animated presentation via a display of a computing device of the print shop operator. Presenting such an animation provides a technical benefit by allowing a user to intuitively identify event interactions and which events have begun, halted, been delayed, or otherwise stalled out.

Step 222 comprises controller 142 listening for a request for another requested time. If a request is made, processing returns to step 210 to handle the new requested time. Alternatively, if no request is made, processing proceeds to step 224, wherein controller 142 determines whether new logs should be generated (e.g., in response to completion of a print job, a processing error, a backhitch, end-of-day, etc.). If new logs should be generated, processing continues to step 202. Otherwise, processing returns to step 222.

Instead of generating new logs on demand, the logs may be exported over the network to the controller 142 as they are written. In that case, the controller 142 will continue to update its event data and to respond to requests for lists of concurrent events using the event data available at the time of the request. In this embodiment, an external process or event or user intervention may periodically trigger a reset of all event data, meaning that only new events occurring after the time of the reset trigger will be processed in response to future requests.

Method 200 provides a technical benefit over prior systems and techniques, because it enables event information to be rapidly considered and reported for a variety of points in time. This helps a printer manufacturer to consider processing operations at numerous points in time to determine how individual nodes operated prior to, for example, a backhitch.

Method 200 may also be utilized for a "reverse process" that searches from the requested time backwards to the first time. In such an embodiment wherein the search proceeds reversed with respect to time flow, end times may be treated as start times, and start times may be treated as end times. Alternatively, equivalent processing may be performed that relies everywhere on end times instead of start times. That is, the order of data on the list may be reversed, such as by relabeling start time and end time, data may be processed by sorting the list by end time instead of start time and finding a "prior time" that was after the requested time (e.g., by adding the longest duration to the prior time). The "prior time" in this case would be rounded up, rather than down, before being used for example as a dictionary key. Likewise, a requested time may be rounded in a different direction in time.

Figure 3:
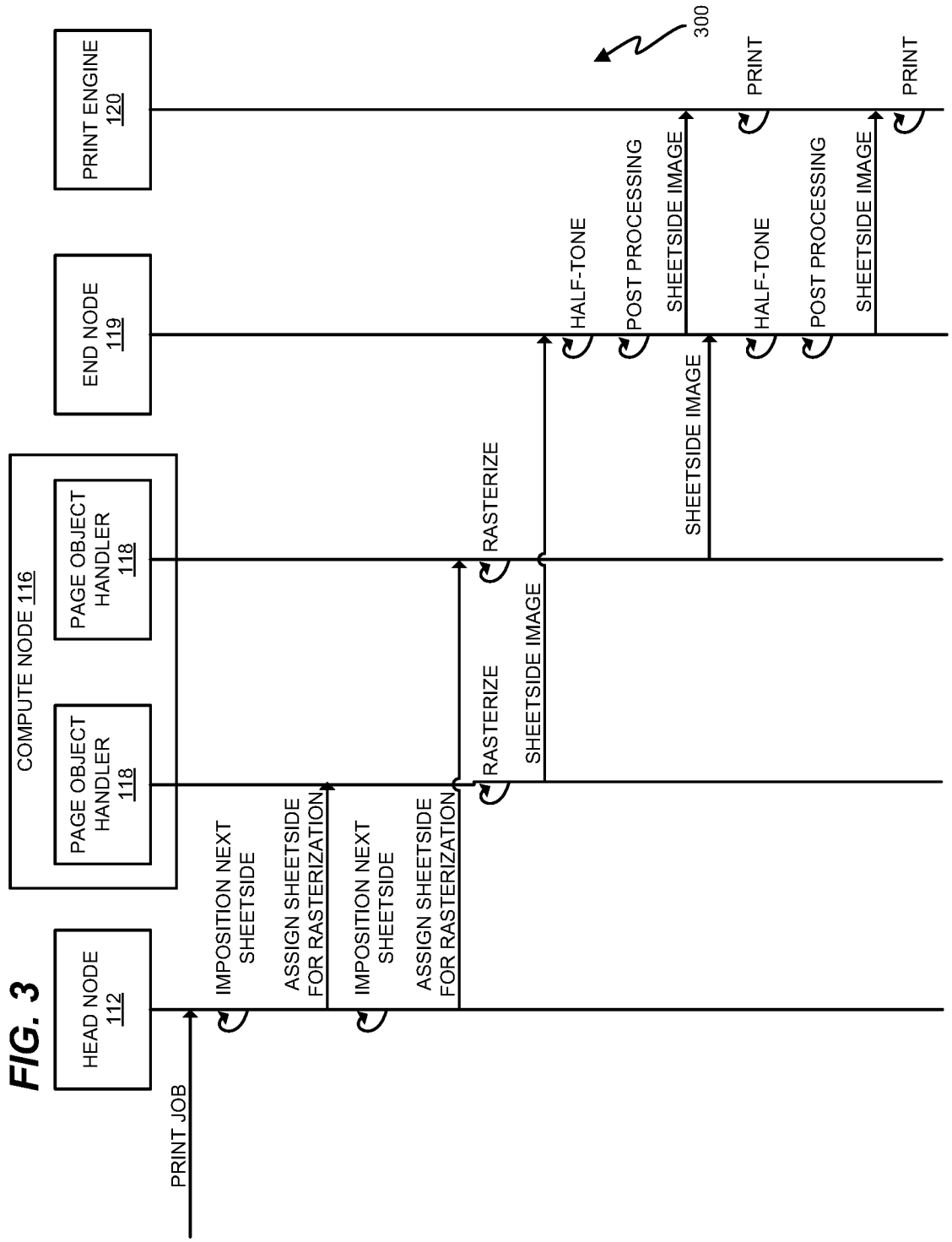
FIG. 3 is a message diagram illustrating communications between components of a distributed computing system illustrative embodiment.

FIG. 3 is a message diagram 300 illustrating communications between components of a distributed computing system 110 illustrative embodiment. FIG. 3 helps to illustrate the process flow during active processing of a print job. According to FIG. 3, a head node 112 receives a print job, and proceeds to imposition sheetsides for the print job. Each time a sheetside has been impositioned, head node 112 assigns the sheetside to a POH 118 at a compute node 116 for rasterization. For example, head node 112 may select a POH 118 with the lowest current processing load. The POHs 118 perform rasterization and pass sheets to an end node 119, which may perform half-toning and post processing, and pass rasterized sheetside images in the proper order and time frame to print engine 120 for printing. In this manner, rasterized images are provided in a just-in-time manner to the print engine 120.

In many embodiments, the creation of a dictionary helps to further increase processing speed for controller 142 when handling requests. To this end, controller 142 may build a dictionary for each list. FIGS. 4-9 depict various implementations related to dictionary processing.

Figure 4:
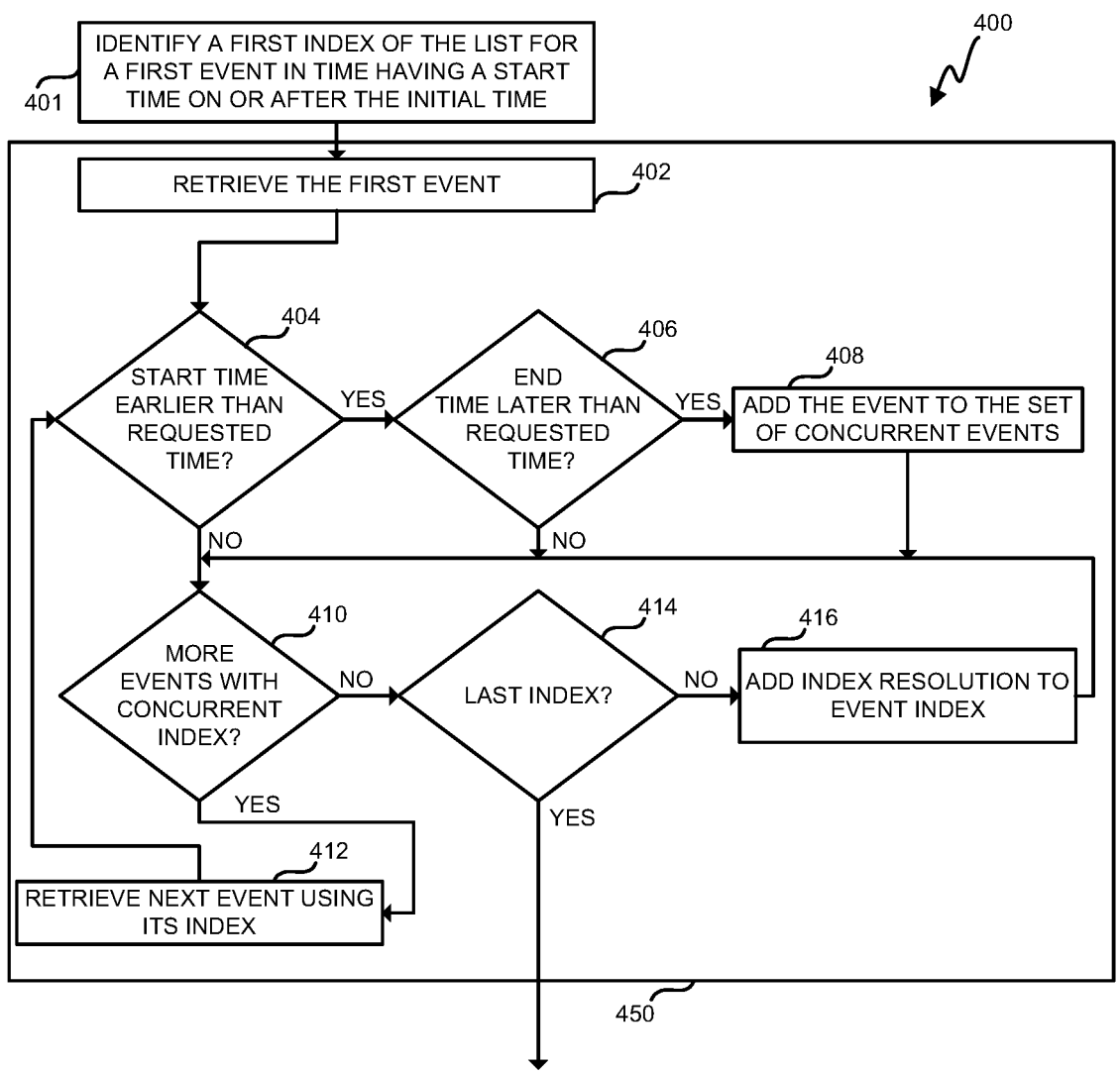
FIG. 4 is a flowchart illustrating a method for identifying a set of events for a requested time in an illustrative embodiment.

FIG. 4 is a flowchart illustrating a method 400 for identifying a set of events for a requested time in an illustrative embodiment.

Step 401 includes identifying a first index of a list for a first event in time having a start time on or after the initial time, and may be performed in a similar manner to step 216 of FIG. 2.

Steps 402-416 together form step 450 for processing the list. Step 402 comprises retrieving the first event. This operation may comprise controller 142 loading an entry for the first event from the list into memory for processing. Step 404 comprises controller 142 determining whether a start time of the event is earlier than the requested time being considered. If so, processing continues to step 406, wherein controller 142 determines whether an end time for the event is later than the requested time. If so, then the event is added to the set of concurrent events in step 408. If start time is not before the requested time in step 404, or the end time is not later than the requested time in step 406, or step 408 is completed, processing continues to step 410.

In step 410, controller 142 determines whether there are more events having a concurrent index (e.g., in a dictionary). If so, processing continues to step 412, wherein a next event at the index is retrieved, and processing returns to step 404.

If there are not more events with a concurrent index, processing moves on to step 414, wherein it is determined whether the current index is the last index (e.g., an index at the requested time). If not, in step 416 an index resolution is added to the event index. That is, an amount delta T is added to the current index, incrementing forward in time. Processing then proceeds to step 410. If the current index is the last index, then processing continues onward, such as to step 220.

Figure 5:
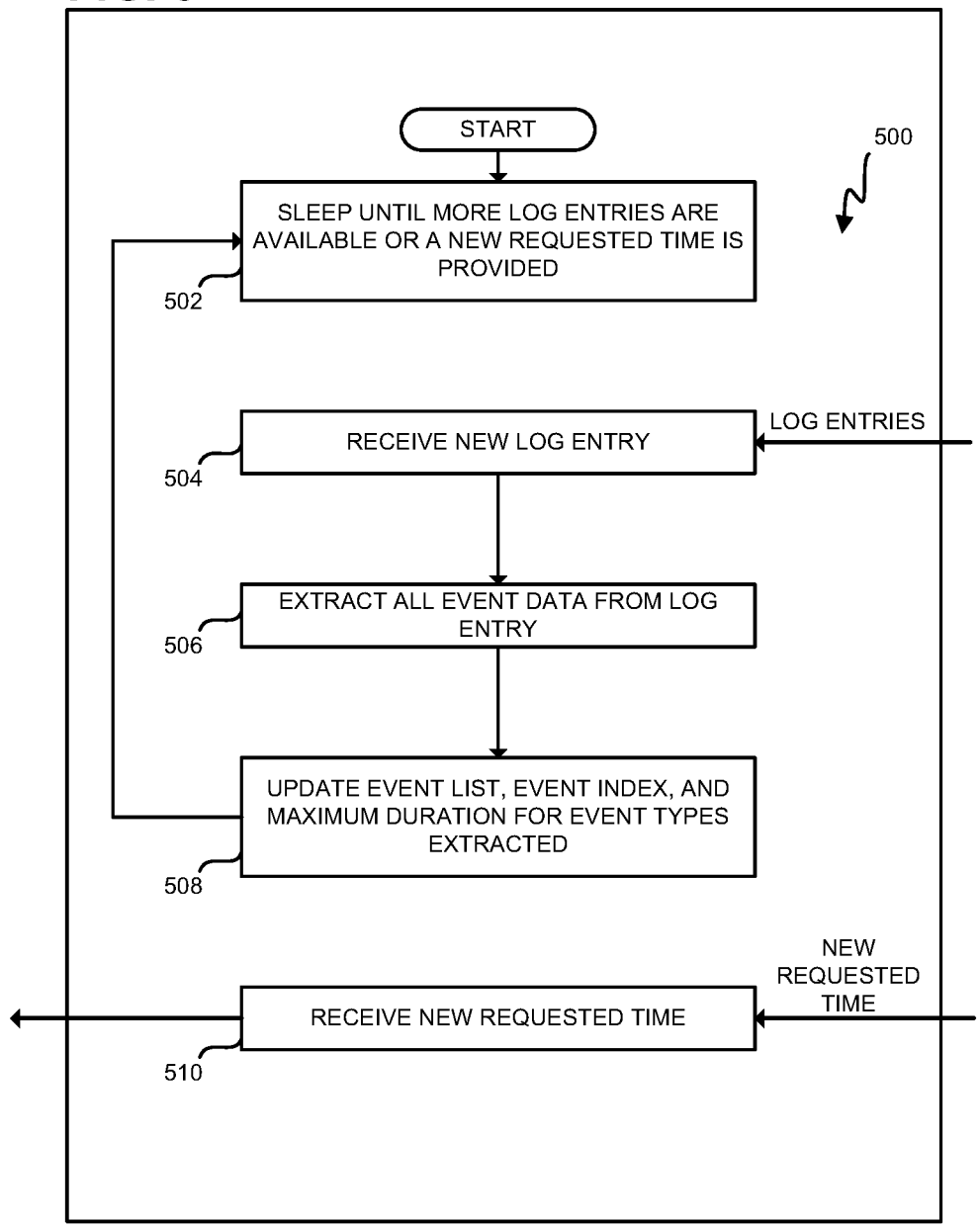
FIG. 5 is a flowchart illustrating a method for background processing in an illustrative embodiment.

FIG. 5 is a flowchart illustrating a method 500 for background processing in an illustrative embodiment, and may be complementary to method 400 of FIG. 4. For example, points in time received during method 500 may be provided for analysis via the techniques of method 400.

In step 502, controller 142 sleeps until more log entries are available, or a new requested time is provided for inspection. In step 504, controller 142 receives a new log entry. This may be performed, for example, via a push notification from a component of distributed computing system 110. In step 506, controller 142 extracts all event data from the log entry, and in step 508, controller 142 updates the event list, event index (e.g., maintained as a dictionary), and maximum duration for the types of event(s) indicated in the log. Processing then returns to step 502.

Step 510 comprises receiving a new requested time for analysis, and may be performed in parallel with and asynchronously from steps 502-508. Whenever a new requested time is received, method 400 of FIG. 4 may be performed to identify corresponding sets of events.

Figure 6:
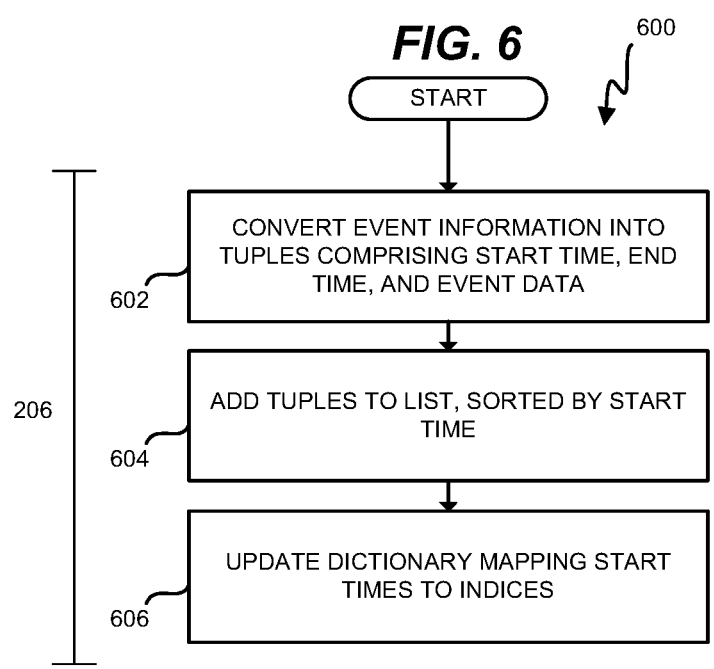
FIG. 6 is a flowchart illustrating a method for generating a dictionary for tracking events in an illustrative embodiment.

FIG. 6 is a flowchart illustrating a method 600 for generating a dictionary for tracking events in an illustrative embodiment. Method 600 may be performed, for example, in step 206 of method 200 of FIG. 2.

Step 602 includes converting event information from logs into tuples that each comprise a start time, end time, and event data. Maintaining event information in a predefined format enhances processing speed by eliminating the need for complex processing instructions.

Step 604 comprises adding tuples for the events to the list, sorted by start time. Sorting the list by start time, during the creation of the list, increases the speed at which the list may be traversed during the operating phase.

Step 606 comprises updating a dictionary (also referred to as an "index map") that maps start times to indices in the list. Before they are used as dictionary keys, start times may be rounded to the nearest tenth of a second, millisecond, etc. according to a predefined time increment of delta T. This allows dictionary keys to be generated from an arbitrary starting point without prior knowledge of the precise set of start times to which each key corresponds. It also allows iteration over the dictionary keys, because the set of possible keys is much smaller than the set of possible start times and is known a priori. A data structure such as a hash map that offers constant time lookup of data corresponding to a given key can be used to store a list of indices that correspond to a dictionary key, which is a value of start time rounded to a multiple of delta T. It is not necessary to store dictionary entries for keys that have no corresponding data.

During processing, controller 142 may compute the prior time from the requested time and then round the prior time to the nearest unit of time incremented by delta T, identify a corresponding key in the dictionary, and then review dictionary data to identify the first index. In this manner, the dictionary further reduces processing load by reducing the amount of time spent traversing a list.

Using an index map to identify a list of event tuple indices that are close to a given start time, using a rounded version to precision Delta T is used as the key into a hash map or similar structure with constant time data access, provides a notable benefit by substantially enhancing processing speed.

FIG. 7 is a list 700 of events in an illustrative embodiment. List 700 stores an entry 710 for each event, and each entry 710 includes a start time, end time, duration, as well as a corresponding sheetside, node, and POH 118 for the event. Each entry 710 also reports an event type, and a name for the event (or other event data as desired).

FIG. 8 is a dictionary 800 for tracking events in an illustrative embodiment. In this embodiment, dictionary 800 comprises keys 810 for points in time separated by a delta T of twenty-five milliseconds. If there are no events within a corresponding time period, a key is omitted. Each key 810 is paired with a list of indices for entries having corresponding start times in the list 700 of FIG. 7. In this manner, determining the relevant entries in a list for a requested time may be performed by rapidly reviewing the dictionary to identify corresponding entries of the list.

Figure 9:
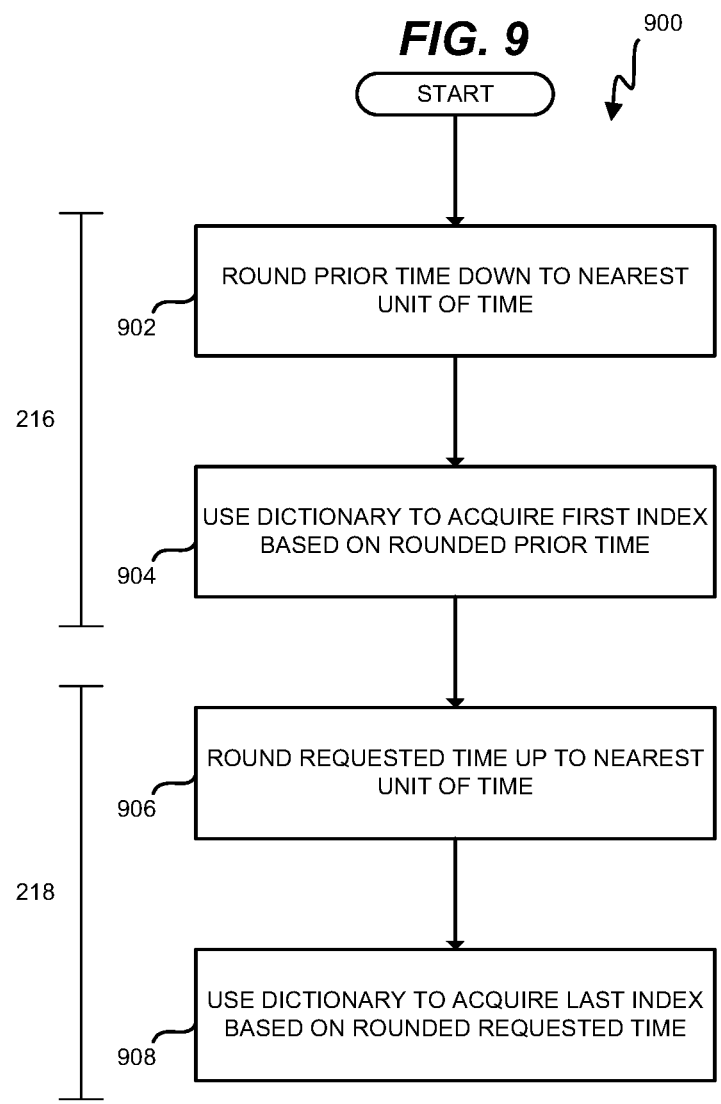
FIG. 9 is a method for detecting concurrent events via a dictionary in an illustrative embodiment.

FIG. 9 is a method 900 for detecting concurrent events via a dictionary in an illustrative embodiment. Method 900 may be performed, for example during steps 216 and 218 of method 200. Step 902 includes rounding the prior time down to a nearest unit of time. The unit of time may be defined by delta T. Step 904 includes using a dictionary to acquire a first index of the list, based on the rounded prior time. This may comprise using the rounded prior time as a key to the dictionary, and identifying a corresponding index of the list. Step 906 comprises rounding up the requested time to the nearest unit of time (e.g., according to delta T), and step 908 comprises using the dictionary to acquire the last index, based on the rounded requested time. This may comprise using the rounded requested time as a key to the dictionary, and identifying a corresponding index within the list based on corresponding dictionary data.

Figure 10:
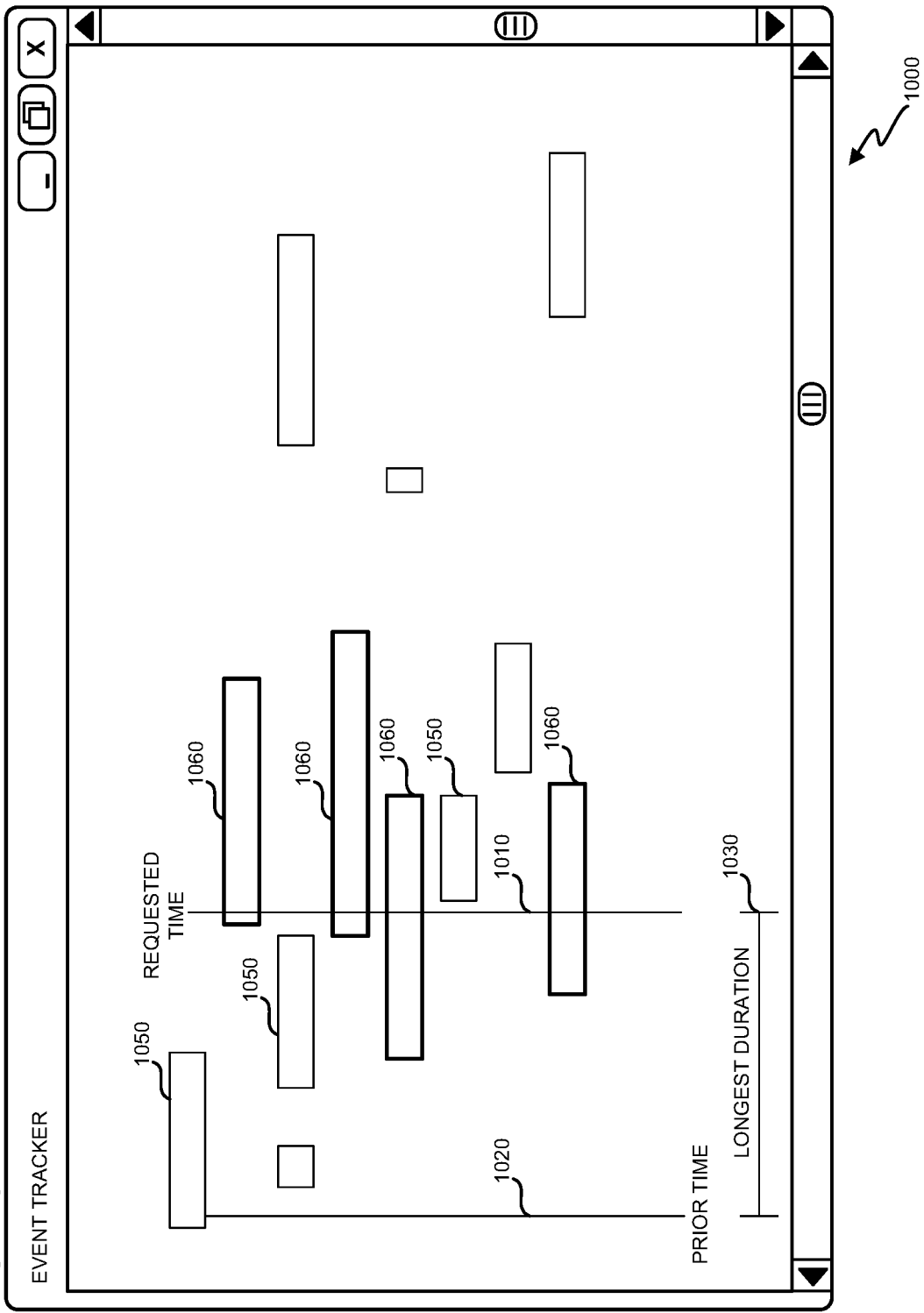
FIG. 10 depicts a Graphical User Interface (GUI) for displaying concurrent events in an illustrative embodiment.

In further embodiments, the controller 142 provides instructions for one or more GUIs that depicts concurrent events at a print processing system 100. FIG. 10 depicts a GUI 1000 for displaying concurrent events in an illustrative embodiment. GUI 1000 presents a requested time 1010, as well as a prior time 1020 separated from the requested time 1010 by a longest duration 1030. GUI 1000 also presents multiple events 1050 within a range of time surrounding the requested time. Controller 142 highlights the events 1060 occurring during the requested time in order to bring these events to the attention of the user. The user may then adjust a position of the requested time. This may be performed by manually reporting a new time, dragging the requested time 1010 to a new location, etc.

In embodiments wherein controller 142 provides sets of events for animated display, GUI 1000 may move requested time 1010 and/or prior time 1020 across multiple points in time, dynamically updating which events 1060 are highlighted for each point in time. In one embodiment, the animation covers points in time both before and after the requested time and is played as an introductory animation prior to presenting information for the requested time at the GUI 1000.

Figure 11:
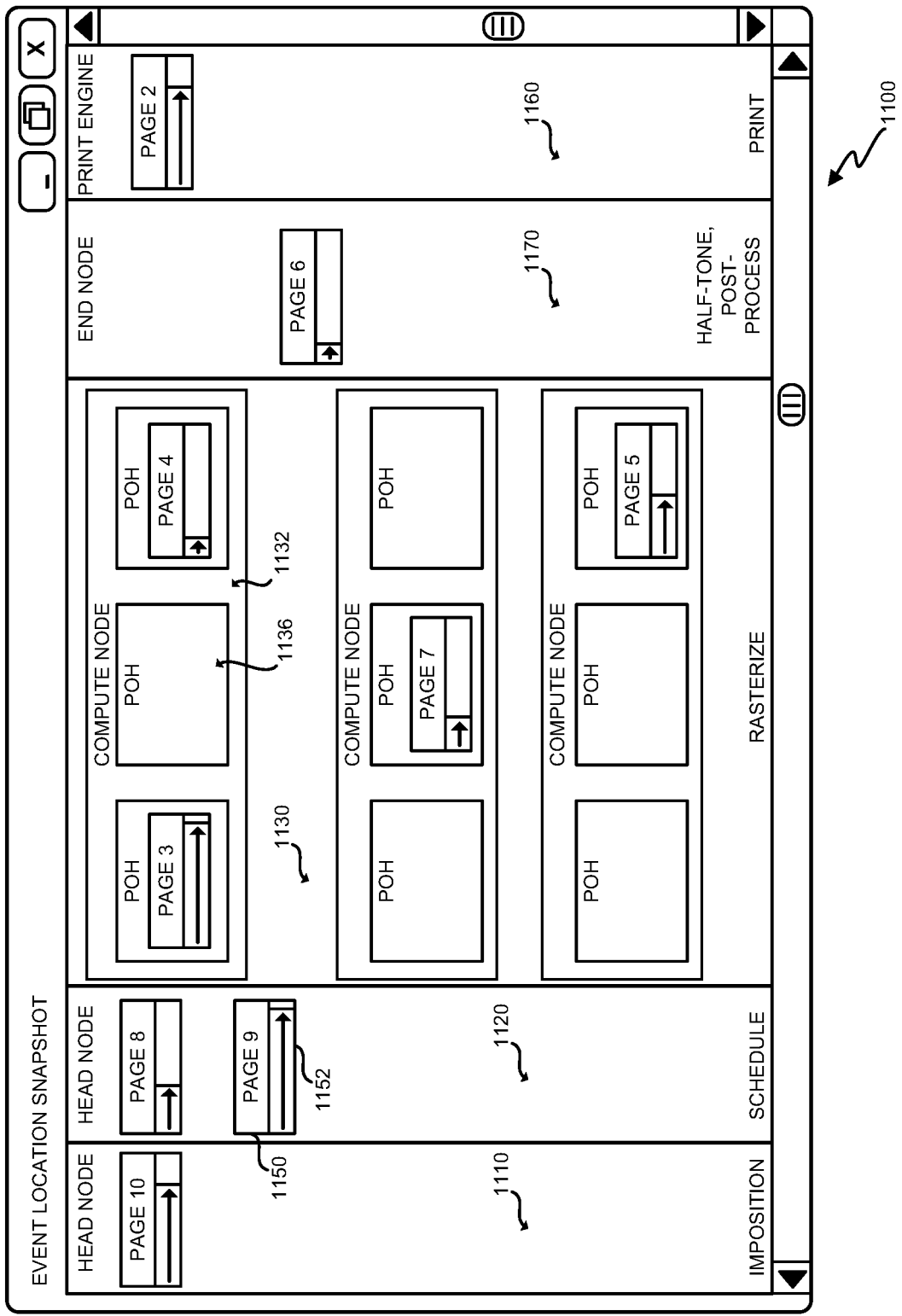
FIG. 11 depicts a further GUI for displaying concurrent events in an illustrative embodiment.

FIG. 11 depicts a further GUI 1100 for displaying concurrent events in an illustrative embodiment. That is GUI 1100 depicts where events were occurring within a distributed computing system 110 at a given requested time. In this embodiment, GUI 1100 includes regions for a head node 112, each of multiple compute nodes 116, one or more end nodes 119, and one or more print engines 120. Events are presented at corresponding regions to enhance intuitive understanding of a user.

GUI 1100 includes presentation area 1110 for displaying imposition events occurring at a head node, and presentation area 1120 for displaying scheduling events occurring at the head node. GUI 1100 also includes presentation area 1130 for displaying events occurring at compute nodes, including objects 1132 for compute nodes and objects 1136 for POHs. Presentation area 1170 displays events occurring at end nodes, such as half-toning and/or post-processing.

GUI 1100 further includes a presentation area 1160 for displaying events occurring at a print engine. Each event is reported by controller 142 via an object 1150, which recites a corresponding sheetside, and presents a progress bar 1152 indicating a percentage completion of the event. Controller 142 may determine where to place the objects 1150 for events onto GUI 1100 based on event types or names and may update progress bars 1152 based on additional event progress information found within the list.

In embodiments wherein controller 142 provides sets of events for animated display, GUI 1100 may update progress bars 1152 and/or the locations of objects 1150 for each of multiple points in time. In one embodiment, the animation covers points in time both before and after the requested time and is played as an introductory animation prior to presenting information for the requested time at the GUI 1100.

Examples

In the following examples, additional processes, systems, and methods are described. The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

A first clause is provided in the form of an event detection system that includes an interface and a controller. The interface is able to acquire logs for each of multiple nodes of a distributed computing system that rasterizes print data for a print job, each log reciting events encountered by at least one of the nodes during rasterization of print data for the print job, and further reciting timing data pertaining to the events. The controller is able to identify the events recited in the logs, to include the events within a list sorted based on at least one of start times or end times indicated by the timing data, and to determine a longest duration of the events. The controller is also able to receive a request to identify events occurring at a requested time, to calculate a prior time separated by the longest duration from the requested time, and to process the list by: identifying a first index of the list for a first event in time having a start time on or after the prior time, and identifying a last index of the list for a last event in time having a start time on or before the requested time. The controller generates a set of events from the list, bounded by the first index and the last index of the list.

A second clause is the system of the first clause, wherein the controller is further configured to repeat processing of the request for additional points in time within a window surrounding the requested time, and to report the sets of events sequentially in time.

A third clause is the system of the first clause through second clause, wherein the controller is further configured to filter out events from the list having at least one selected from the group consisting of: end times before the requested time and start times after the requested time.

A fourth clause is the system of the first clause through third clause, wherein the controller is further configured to identify a type of each event, and to filter out events from the list based on type.

A fifth clause is the system of the first clause through fourth clause, wherein the controller is further configured to extract events having a duration greater than a predefined threshold from the list for placement into a second list for the controller to independently process in response to requests.

A sixth clause is the system of the first clause through fifth clause, wherein the predefined threshold is a number of standard deviations from a mean duration of the events.

A seventh clause is the system of the first clause through sixth clause, wherein the controller is further configured to provide Graphical User Interface (GUI) instructions to depict regions for multiple hardware nodes within a printer handling the print job, and for presenting the events at corresponding ones of the regions.

An eighth clause is a non-transitory computer readable medium embodying programmed instructions which, when executed by a processor, perform the steps of acquiring logs for each of multiple nodes of a distributed computing system that rasterizes print data for a print job, each log reciting events encountered by at least one of the nodes during rasterization of print data for the print job, and further reciting timing data pertaining to the events. The steps also include identifying the events recited in the log, including the events within a list sorted based on at least one of start times or end times indicated by the timing data, determining a longest duration of the events, receiving a request to identify events occurring at a requested time, and calculating a prior time separated by the longest duration from the requested time. Still further, the steps include processing the list by: identifying a first index of the list for a first event in time having a start time on or after the prior time, and identifying a last index of the list for a last event in time having a start time on or before the requested time. The steps also include generating a set of events from the list, bounded by the first index and the last index of the list.

A ninth clause is the medium of the eighth clause wherein the programmed instructions are further operable for: repeating processing of the request for additional points in time within a window surrounding the requested time; and reporting the sets of events sequentially in time.

A tenth clause is the medium of the eighth clause through ninth clause wherein the instructions are further operable for: filtering out events from the list having at least one selected from the group consisting of: end times before the requested time and start times after the requested time.

An eleventh clause is the medium of the eighth clause through tenth clause wherein the programmed instructions are further operable for: identifying a type of each event; and filtering out events from the list based on type.

A twelfth clause is the medium of the eighth clause through eleventh clause wherein the programmed instructions are further operable for: extracting events having a duration greater than a predefined threshold from the list for placement into a second list for independent processing in response to requests.

A thirteenth clause is the medium of the eighth clause through twelfth clause wherein the predefined threshold is a number of standard deviations from a mean duration of the events.

A fourteenth clause is the medium of the eighth clause through thirteenth clause wherein the programmed instructions are further operable for: providing Graphical User Interface (GUI) instructions to depict regions for multiple hardware nodes within a printer handling the print job, and for presenting the events at corresponding ones of the regions.

A fifteenth clause is a method that includes the steps of acquiring logs for each of multiple nodes of a distributed computing system that rasterizes print data for a print job, each log reciting events encountered by at least one of the nodes during rasterization of print data for the print job, and further reciting timing data pertaining to the events. The steps also include identifying the events recited in the log, including the events within a list sorted based on at least one of start times or end times indicated by the timing data, determining a longest duration of the events, receiving a request to identify events occurring at a requested time, and calculating a prior time separated by the longest duration from the requested time. Still further, the steps include processing the list by: identifying a first index of the list for a first event in time having a start time on or after the prior time, and identifying a last index of the list for a last event in time having a start time on or before the requested time. The steps also include generating a set of events from the list, bounded by the first index and the last index of the list.

A sixteenth clause is the method of the fifteenth clause, further comprising: repeating processing of the request for additional points in time within a window surrounding the requested time; and reporting the sets of events sequentially in time.

A seventeenth clause is the method of the fifteenth clause through sixteenth clause, further comprising: filtering out events from the list having at least one selected from the group consisting of: end times before the requested time and start times after the requested time.

An eighteenth clause is the method of the fifteenth clause through seventeenth clause, further comprising: identifying a type of each event; and filtering out events from the list based on type.

A nineteenth clause is the method of the fifteenth clause through eighteenth clause, further comprising: extracting events having a duration greater than a predefined threshold from the list for placement into a second list for independent processing in response to requests.

A twentieth clause is the method of the fifteenth clause through nineteenth clause, wherein: the predefined threshold is a number of standard deviations from a mean duration of the events.

Figure 12:
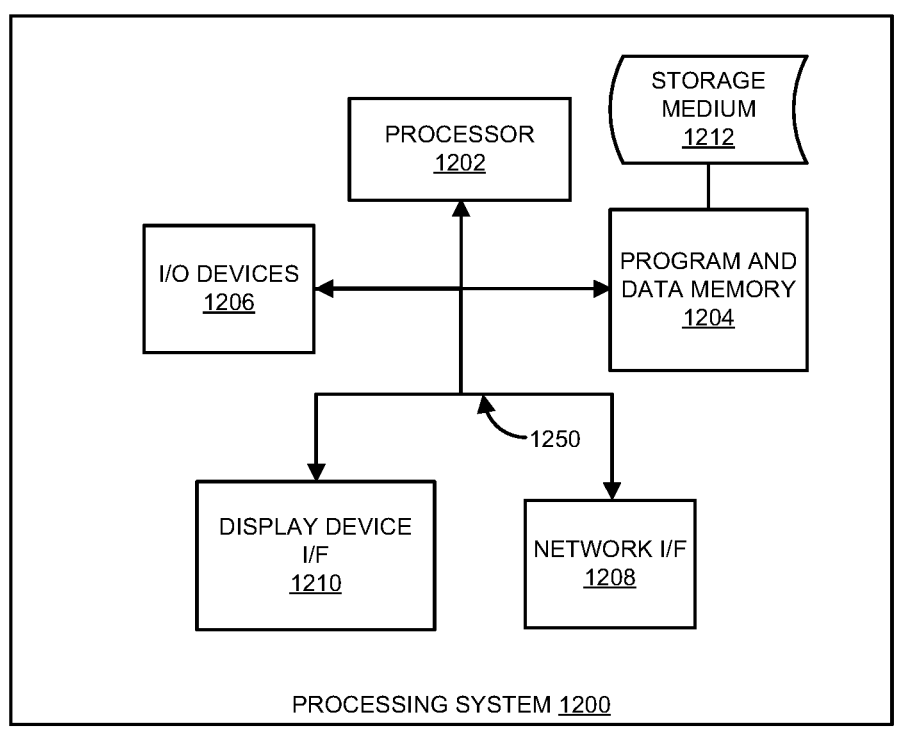
FIG. 12 illustrates a processing system operable to execute a computer readable medium embodying programmed instructions to perform desired functions in an illustrative embodiment.

Embodiments disclosed herein can take the form of software, hardware, firmware, or various combinations thereof. In one particular embodiment, software is used to direct a processing system of distributed computing system 110 to perform the various operations disclosed herein. FIG. 12 illustrates a processing system 1200 operable to execute a computer readable medium embodying programmed instructions to perform desired functions in an illustrative embodiment. Processing system 1200 is operable to perform the above operations by executing programmed instructions tangibly embodied on computer readable storage medium 1212. In this regard, embodiments of the invention can take the form of a computer program accessible via computer-readable medium 1212 providing program code for use by a computer or any other instruction execution system. For the purposes of this description, computer readable storage medium 1212 can be anything that can contain or store the program for use by the computer.

Computer readable storage medium 1212 can be an electronic, magnetic, optical, electromagnetic, infrared, or semiconductor device. Examples of computer readable storage medium 1212 include a solid-state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 1200, being suitable for storing and/or executing the program code, includes at least one processor 1202 coupled to program and data memory 1204 through a system bus 1250. Program and data memory 1204 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 1206 (including but not limited to keyboards, displays, pointing devices, etc.) can be coupled either directly or through intervening I/O controllers. Network adapter interfaces 1208 may also be integrated with the system to enable processing system 1200 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 1210 may be integrated with the system to interface to one or more display devices, such as printing systems and screens for presentation of data generated by processor 1202.

Although specific embodiments were described herein, the scope of the invention is not limited to those specific embodiments. The scope of the invention is defined by the following claims and any equivalents thereof.

What is claimed is:

1. An event detection system comprising:
an interface configured to acquire logs for each of multiple nodes of a distributed computing system that performs parallel processing by each of the multiple nodes to rasterize print data for a print job, each log reciting events encountered by a corresponding node of the multiple nodes during rasterization of print data for the print job and further reciting timing data pertaining to the events, wherein the timing data for each of the events includes at least two of: a start time, an end time, and a duration, wherein chronologically sequential events in the multiple nodes are distributed over the corresponding logs for each of the multiple nodes; and
a controller configured:
to identify the events recited in the logs,
to sort the events from the logs based on the timing data to generate a sorted list of events wherein each event is associated with an index in the sorted list, and
to determine a longest duration of the events within the sorted list,
the controller is further configured:
to receive a request to identify events occurring at a requested time,
to calculate a prior time separated by the longest duration from the requested time, and
to process the sorted list by:
identifying a first index of the sorted list for a first event in time having a start time on or after the prior time, and
identifying a last index of the sorted list for a last event in time having a start time on or before the requested time,
the controller is further configured to generate a set of concurrent events from the sorted list, bounded by the first index and the last index of the sorted list.

2. The system of claim 1 wherein:
the controller is further configured to repeat processing of the request for additional points in time within a window surrounding the requested time generating an updated set of concurrent events, and to report the updated set of concurrent events sequentially in time.

3. The system of claim 1 wherein:
the controller is further configured to remove events from the set of concurrent events having end times before the requested time or start times after the requested time.

4. The system of claim 1 wherein:
the controller is further configured to identify a type of each event in the set of concurrent events, and to remove events from the set of concurrent events based on type.

5. The system of claim 1 wherein:
the controller is further configured to extract events having a duration greater than a predefined threshold from the sorted list.

6. The system of claim 5 wherein:
the predefined threshold is a number of standard deviations from a mean duration of the events.

7. The system of claim 1 wherein:
the controller is further configured to provide Graphical User Interface (GUI) instructions to depict regions for each of the multiple nodes within a printer handling the print job, and for presenting the events at corresponding ones of the regions.

8. A non-transitory computer readable medium embodying programmed instructions which, when executed by a processor, are operable for:
acquiring logs for each of multiple nodes of a distributed computing system that performs parallel processing by each of the multiple node to rasterize print data for a print job, each log reciting events encountered by a corresponding node of the multiple nodes during rasterization of print data for the print job and further reciting timing data pertaining to the events, wherein the timing data for each of the events includes at least two of: a start time, an end time, and a duration, wherein chronologically sequential events in the multiple nodes are distributed over the corresponding logs for each of the multiple nodes;
identifying the events recited in the logs;
sorting the events from the logs based on the timing data to generate a single sorted list of events wherein each event is associated with an index in the sorted list;

determining a longest duration of the events within the sorted list;

receiving a request to identify events occurring at a requested time;

calculating a prior time separated by the longest duration from the requested time;

processing the sorted list by:
identifying a first index of the sorted list for a first event in time having a start time on or after the prior time; and identifying a last index of the sorted list for a last event in time having a start time on or before the requested time; and generating a set of concurrent events from the sorted list, bounded by the first index and the last index of the sorted list.

9. The medium of claim 8 wherein the programmed instructions are further operable for:
repeating processing of the request for additional points in time within a window surrounding the requested time generating an updated set of concurrent events; and
reporting the updated set of concurrent events sequentially in time.

10. The medium of claim 8 wherein the programmed instructions are further operable for:
removing events from the set of concurrent events having end times before the requested time or start times after the requested time.

11. The medium of claim 8 wherein the programmed instructions are further operable for:
identifying a type of each event; and
removing events from the set of concurrent events based on type.

12. The medium of claim 8 wherein the programmed instructions are further operable for:
extracting events having a duration greater than a predefined threshold from the sorted list.

13. The medium of claim 12 wherein:
the predefined threshold is a number of standard deviations from a mean duration of the events.

14. The medium of claim 8 wherein the programmed instructions are further operable for:
providing Graphical User Interface (GUI) instructions to depict regions for each of the multiple nodes within a printer handling the print job, and for presenting the events at corresponding ones of the regions.

15. A method comprising:
acquiring logs for each of multiple nodes of a distributed computing system that performs parallel processing by each of the multiple nodes to rasterize print data for a print job, each log reciting events encountered by a corresponding node of the multiple nodes during rasterization of print data for the print job and further reciting timing data pertaining to the events, wherein the timing data for each of the events includes at least two of: a start time, an end time, and a duration, wherein chronologically sequential events in the multiple nodes are distributed over the corresponding logs for each of the multiple nodes;

identifying the events recited in the logs;

sorting the events from the logs based on the timing data to generate a single sorted list of events wherein each event is associated with an index in the sorted list;

determining a longest duration of the events within the sorted list;

receiving a request to identify events occurring at a requested time;

calculating a prior time separated by the longest duration from the requested time;

processing the sorted list by:
identifying a first index of the sorted list for a first event in time having a start time on or after the prior time; and identifying a last index of the sorted list for a last event in time having a start time on or before the requested time; and generating a set of concurrent events from the sorted list, bounded by the first index and the last index of the sorted list.

16. The method of claim 15 further comprising:
repeating processing of the request for additional points in time within a window surrounding the requested time generating an updated set of concurrent events; and
reporting the updated set of concurrent events sequentially in time.

17. The method of claim 15 further comprising:
removing events from the set of concurrent events having end times before the requested time or start times after the requested time.

18. The method of claim 15 further comprising:
identifying a type of each event in the set of concurrent events; and
removing events from the set of concurrent events based on type.

19. The method of claim 15 further comprising:
extracting events having a duration greater than a predefined threshold from the sorted list.

20. The method of claim 19 wherein:
the predefined threshold is a number of standard deviations from a mean duration of the events.

* * * * *